E. JACQUET.
HONEY EXTRACTOR.
APPLICATION FILED JUNE 17, 1915.

1,176,562.

Patented Mar. 21, 1916.
2 SHEETS—SHEET 2.

Inventor
E. Jacquet
by [signature]
Atty

UNITED STATES PATENT OFFICE.

ETIENNE JACQUET, OF LA VALLÉE BÉGAT, NEAR LA CHARITÉ-SUR-LOIRE, FRANCE.

HONEY-EXTRACTOR.

1,176,562.   Specification of Letters Patent.   Patented Mar. 21, 1916.

Application filed June 17, 1915. Serial No. 34,765.

*To all whom it may concern:*

Be it known that I, ETIENNE JACQUET, a citizen of the French Republic, residing at La Vallée Bégat, near La Charité-sur-Loire, Department of Nièvre, France, have invented certain new and useful Improvements in Honey-Extractors, of which the following is a specification.

The present invention relates to a honey extractor of the vertical type, so constructed as to permit of several combs contained in frames being simultaneously emptied without using any cages.

The accompanying drawings represent an embodiment of the invention.

Figure 1:
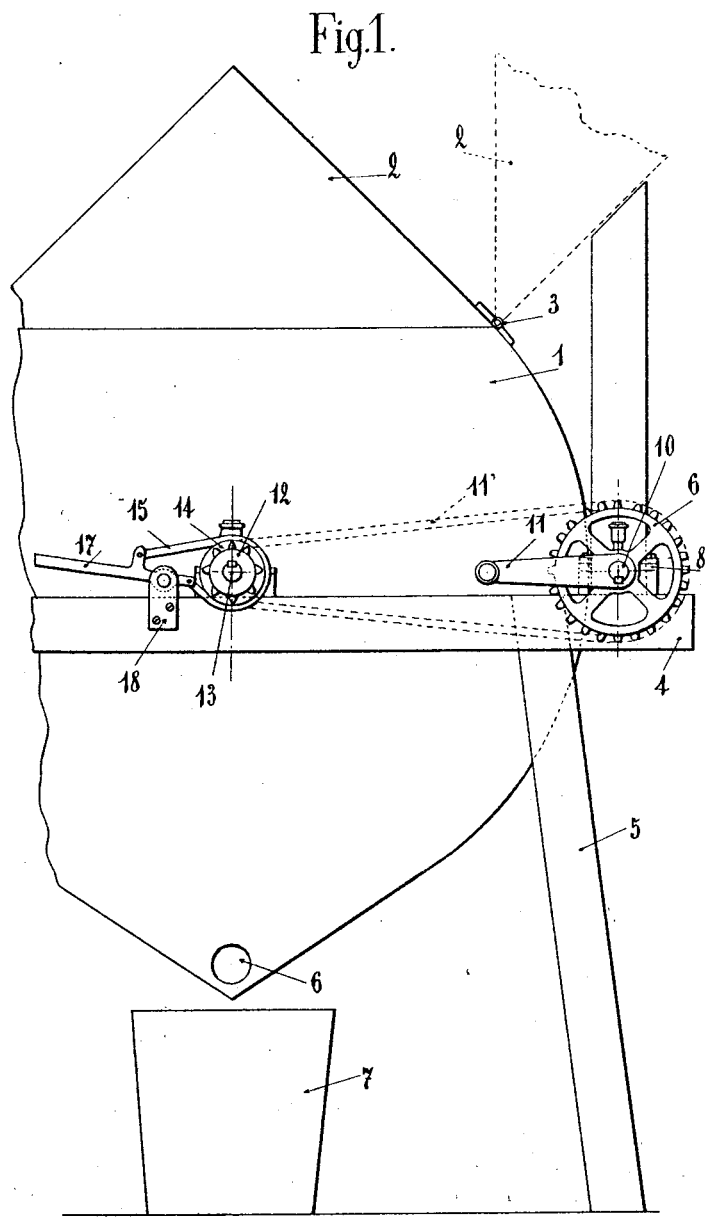
Figure 2:
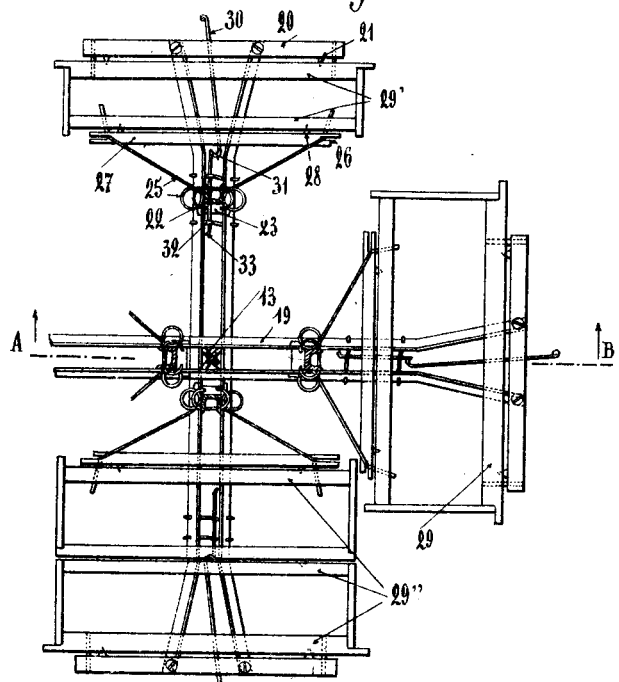
Figure 3:
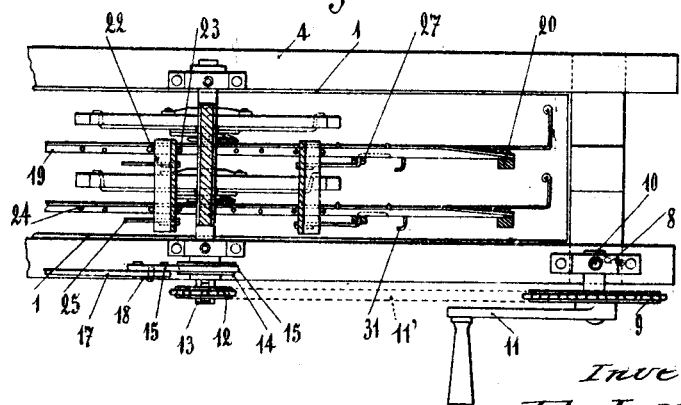

Figure 1 shows the apparatus closed in front view, the opened position of the cover being indicated by dotted lines. Fig. 2 illustrates the inner mechanism of the device in front view. Fig. 3 is a section through the line A—B Fig. 2.

The device substantially consists of a casing or box 1, provided with a cover 2 jointed by a hinge or hinges 3, the said box is supported on a framing 4 mounted upon legs 5. Near the base of the casing 1 is provided a hole 6 which may be closed at will either by a cock or any convenient plug, through which the honey extracted from the combs in the apparatus flows into a receiver 7 placed under the box or casing.

The box 1 preferably consists of two parts or halves, the lower half being fixed in the framing 4 while the upper half is removable, in order to permit of inspecting the interior of the device.

On a bracket of the said framing 4, on the side of the casing, is mounted a sprocket wheel 9 secured to an axle 10 turning in a bearing 8 and actuated by a crank or winch 11, the said sprocket wheel 9 actuates through a chain 11' (schematically represented by dotted lines) a pinion 12 secured to an axle 13 which extends throughout the casing pan or tank, in the center thereof. On the said axle 13 is also secured a brake-wheel 14 braked at will by a pressure exerted by a brake-band 15 actuated by a lever 17 pivoted on a bracket 18 on the framing.

Secured in a convenient manner, for instance by bolts, on the axle 13, which latter preferably consists of a cross-shaped iron turned out at both ends, in order to enter the framing ball-bearings, are arms 19, 19, formed by L-shaped irons. Secured in a convenient manner to the free extremity of each pair of arms 19 is a cross-bar 20 acting as a stop for the frames, which are retained thereto by two tacks or small nails 21, 21, provided near the ends of the said cross-bar.

A sliding block 22, which preferably consists of a U-shaped iron and sliding between the said arms 19, 19, and controllable by bolts, 23, 23 extended through openings or holes 24, 24 of the arms 19, 19 is provided with springs 25, 25, secured to the block 22 and extending at their free end through a slide-guide 26 in a cross-bar 27 sliding and guided on each pair of arms 19. Near its ends, the said cross-bar 27 has two tacks 28—28, which, under the pressure of the said springs 25, will be driven in the framewood.

As the frames supporting the combs 29, 29 have various sizes, the sliding block 22 may be so adjusted to the convenient height that the pressure of the springs 25 is sufficient to retain the frames between the fixed cross-bar 20 and the movable cross-bar 27. As shown in Fig. 2 of the drawings, the same apparatus may be used to support frames either of larger sizes, such as 29, or of smaller sizes, such as 29', or even two half-frames, such as 29'', 29''. When half frames are used, however, two of the latter are preferably placed on each arm of the device, as shown at 29'', Fig. 2, and then as, under the pressure of the springs 25, 25 and of the rotation, such frames would be loosened in the middle, there is provided, between both the arms 19 of each pair of arms, a metal rod 30, which forms a hook 31 and slides in cross-bars provided with eyelets 32, 32. The extremity 33 of such sliding rods is curved, in order to prevent the same from sliding out the eyelets 32 owing to the rotatory motion of the device. When extracting honey from large frames, the said hook 31 will be thrust behind the arm 19 on the right side, against which it remains applied, in order not to impede when placing the frame.

When half frames are used, after the exterior half frame is applied against the cross bar 20, the rod 30 will be caused to slide, so that its hook 31 is applied on the edge of the half frame placed near the axis of the device, in this manner, the half frame placed near the axis is retained by the said hook 31 and tacks or nails 28, and the outer half frame is fitted between the said half frame and cross-bar 20 and thereby retained by the nails or points 21 which prevent the said half frame from sliding.

The whole of the arms 19, 19 are loaded with frames or half frames, by placing the frame close to the cross-bar 20 and bringing the cross-bar 27, by the movement of the sliding block 22, into the convenient position for maintaining the said frames under the pressure of the springs 25.

While the drawing shows only eight arms, the apparatus might also have twelve, sixteen, twenty or more arms.

When the whole of the arms are loaded, the hinged cover 2 is turned down and mechanism is put into rotation by the action of the crank 11. The honey, which falls from the combs in the tank or casing 1, will flow through the hole 6 into the receiver 7. As soon as the extraction is found sufficient, that is to say finished, the apparatus will be stopped by acting upon the lever 17 which will apply or draw the brake-band 15 closer on to the brake-wheel 14.

The pairs of arms are preferably diametrically arranged on the axle 13, each pair, therefore, being double on both sides on the shaft or axle, the succeeding pairs are placed at 90° to each other, so as to obtain a cross-shaped arrangement.

It will be obvious that secondary modifications may be effected in the construction of the said apparatus, without departing from the scope of the present invention.

Claims:

1. A centrifugal honey extractor comprising in combination a casing, a central shaft, a plurality of pairs of radial arms on said shaft, a cross bar connecting the arms of each pair, and means carried by each pair of arms adapted to clamp a honey comb box against the cross bar.

2. A centrifugal honey extractor comprising in combination a casing, a central shaft, a plurality of pairs of radial arms on said shaft, a cross bar connecting the arms of each pair, and resilient adjustable means carried by each pair of arms adapted to clamp a honey comb box against the cross bar.

3. A centrifugal honey extractor comprising in combination a casing, a central shaft, a plurality of pairs of radial arms on said shaft, a cross bar connecting the arms of each pair, means carried by each pair of arms adapted to clamp a honey comb box against the cross bar, said means comprising a block adapted to slide between the arms of each pair, a plurality of spring members carried by the block, and a cross bar supported by said spring members and coöperating with said first mentioned cross bar to clamp a honey comb box therebetween.

4. A centrifugal honey extractor comprising in combination a casing, a central shaft, a plurality of pairs of radial arms on said shaft, a cross bar connecting the arms of each pair, means carried by each pair of arms adapted to clamp a honey comb box against the cross bar, said means comprising a block adapted to slide between the arms of each pair, a plurality of spring members carried by the block, a cross bar supported by said spring members and coöperating with said first mentioned cross bar to clamp a honey comb box therebetween, and means for securing said block against movement.

5. A centrifugal honey extractor comprising in combination a casing, a central shaft, a plurality of pairs of radial arms on said shaft, a cross bar connecting the arms of each pair, resilient adjustable means carried by each pair of arms adapted to clamp a honey comb box against the cross bar, and means for securing said block against movement.

ETIENNE JACQUET.

Witnesses:
 RENÈ JAUGNET,
 GASTON PETIAN.